K. MIYANAGA.
STAND ATTACHMENT FOR CYCLES.
APPLICATION FILED JULY 12, 1915.
1,183,834.
Patented May 16, 1916.
2 SHEETS—SHEET 1.
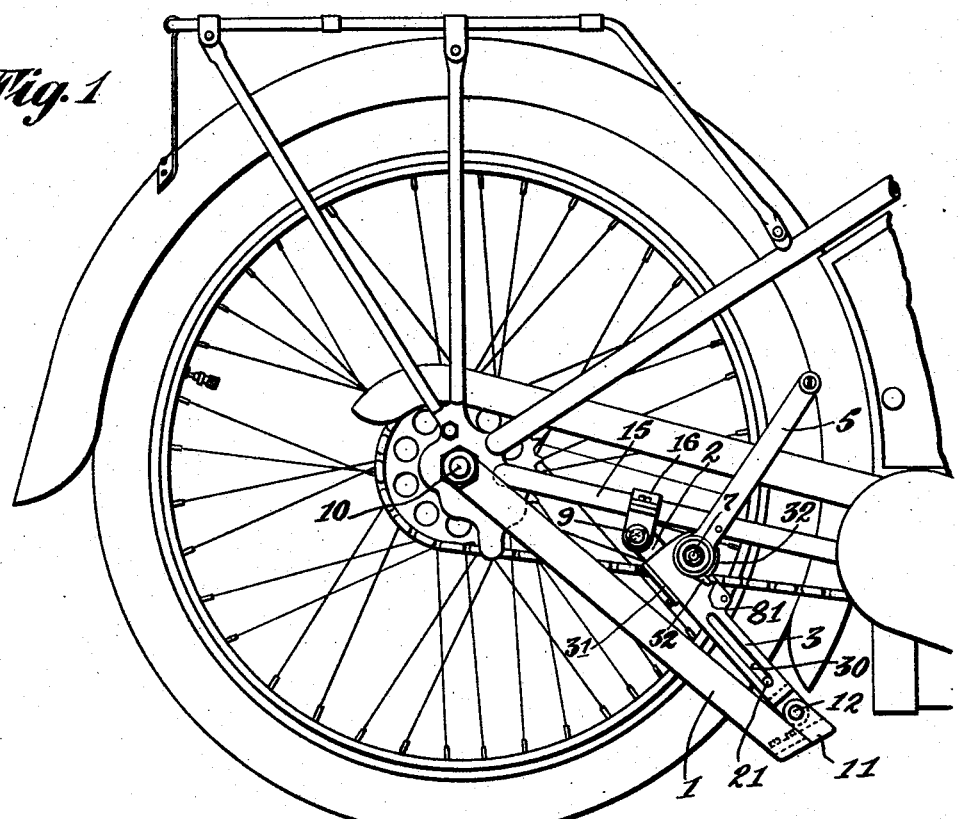
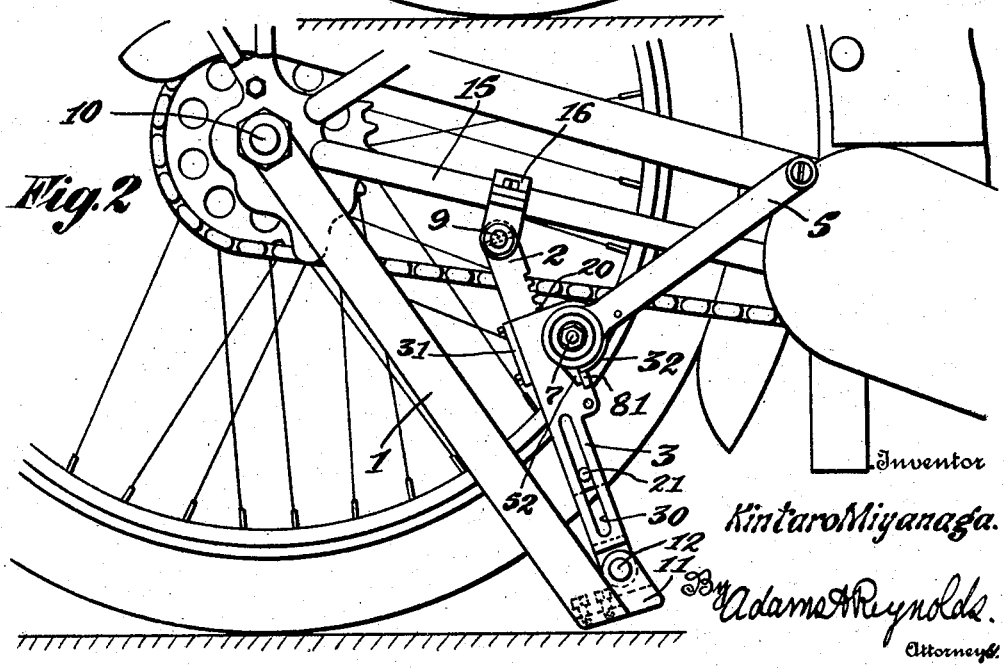
Inventor
Kintaro Miyanaga.
By Adams & Reynolds
Attorneys

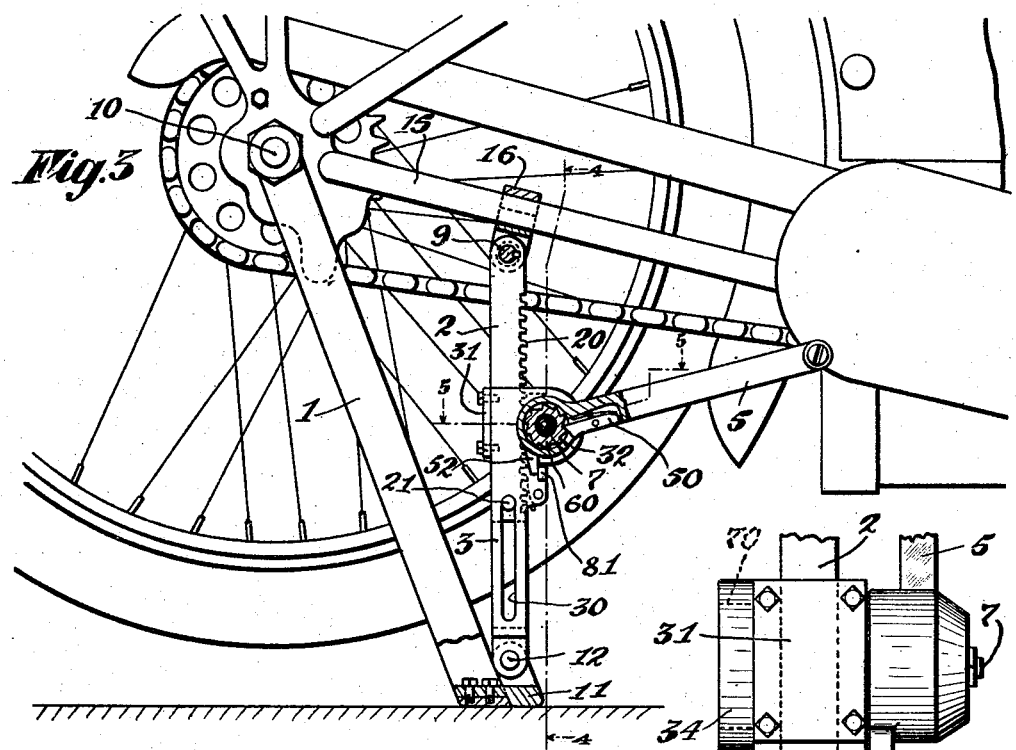

UNITED STATES PATENT OFFICE.

KINTARO MIYANAGA, OF SEATTLE, WASHINGTON.

STAND ATTACHMENT FOR CYCLES.

1,183,834.    Specification of Letters Patent.    Patented May 16, 1916.

Application filed July 12, 1915. Serial No. 39,243.

*To all whom it may concern:*

Be it known that I, KINTARO MIYANAGA, a subject of the Emperor of Japan, and resident of the city of Seattle, county of King, and State of Washington, have invented certain new and useful Improvements in Stand Attachments for Cycles, of which the following is a specification.

My invention relates to cycle supporting devices intended for supporting the cycle when not in use with its rear wheel off the ground.

One object of my invention is to provide a device for this purpose which may be operated by the rider from his seat, and which has sufficient power that he may be able to raise the rear wheel of the cycle up while he is thereon, if this be desired.

My invention comprises the novel parts and combinations thereof which will be hereinafter described and particularly pointed out in the claims.

In the accompanying drawings I have shown my invention in the form of construction which is most preferred by me.

Figure 1 is a side view of a rear portion of a cycle with my device mounted thereon, said device being in raised position or that occupied when the machine is in use. Fig. 2 is a similar view showing the device in position when the supporting leg has just reached the ground. Fig. 3 is a like view showing the cycle wheel raised. Fig. 4 is a section on the line 4—4 of Fig. 3. Fig. 5 is a section on the line 5—5 of Fig. 3. Fig. 6 is a section on the line 6—6 of Fig. 4, and Fig. 7 is a front view of the part of the device containing the rack engaging pinion and the pivoted end of the pedal lever, the view being from the rear.

The supporting leg 1 of my device is made of a bar bent into a form resembling a stirrup or an elongated U with the ends drawn together, these ends being pivoted on the axle of the rear wheel or to some convenient support adjacent to this point. In connection with this and controlling its position, is a second arm or brace which is composed of two members 2 and 3 which are telescopic or adjustable lengthwise relative to each other. One of these members, as the member 2, is provided with teeth 20, making of it a rack bar. This member 2 is pivotally supported from a frame member 15 of the cycle frame, by means of a clip 16, which is secured thereto at a point forwardly of the rear axle 10. The other member 3 of the adjustable brace is herein shown as composed of two parallel bars, between which the member 2 slides. The member 3 has a slot 30 for the reception of a guide pin 21 carried by the member 2. The member 3 has two ears 32, projecting forwardly between which is journaled a pinion 4, which meshes with the teeth 20 of the member 2. Pinion 4 has a certain number of teeth at one side mounted so that when in the position shown in Fig. 6, the rack bar 2 may be freely reciprocated. Engaging the opposite side of the bar 2 opposite the pinion 4 is a removable plate 31. By the removal of the bar 2 and the plate 31 the pinion 4 may be removed or put in position having first been freed of its pivot pin.

I prefer to have the two ears 32, which lie at opposite sides of the pinion 4, connected by a web 33, thus inclosing the pinion and preventing possibility of engagement therewith. The lower end of member 3 is pivotally connected with the lower end of the supporting legs 1. The manner of this connection shown is indirect, the member 3 being pivoted at 12 to a casting 11, which is secured to the ground-engaging portion of the legs 1.

The pedal or foot operating lever 5 is pivotally mounted upon the outer end of a pin 6, which pin is provided with teeth 60 for engagement by a pawl 50, carried by the arm 5. This pawl is spring held in engagement with the ratchet teeth 60. The pin 6 is fixed to the pinion 4 and is preferably provided with ball bearings 61. It is axially bored to provide a chamber for the reception of a spring 62, which is engaged at one end, as at 63, to the lever 5, and at its other end is connected with the head 70 of pin 7. This spring 62 acts to raise the lever 5 into its upper or operative position. Pin 7 passes through the coils of the spring 62 and the web 51, which is a part of the lever 5 and which covers the end of the pin 6. The head 70, of pin 7, is square, or such other non-circular shape as may be desired, and fits a hole of like shape formed in a boss 34 of the bar 3, whereby the pin 7 is prevented from turning.

A pawl or dog 8 is pivoted upon the bar 3 in such position that its tip will engage the teeth 20 of bar 2. The teeth 20 are shown as having the face, which is lowermost, substantially perpendicular so that the engagement of the pawl 8 therewith will be of such nature as will prevent slippage. The pawl 8 is held in engagement by a spring 80. This pawl has a lug 81 projecting beyond the side face of the bar 3 and in position to be engaged by a lug 52, carried by the arm 5. This lug 52 is so placed that it will not engage with the lug 81 of the pawl 8, except when the arm 5 is thrown backward beyond the position to which it would be normally carried by the action of the spring 62. This is done only when it is desired to release the pawl 8. This is also done only when the pinion 4 is in the position shown in Fig. 6 wherein the sector thereof, which is devoid of teeth, is presented to the bar 2. In this position, with the pawl 8 removed, the two bars 2 and 3 may be freely moved lengthwise of each other.

The pin 9, by which the bar 2 is pivotally mounted upon the clip 16, is fixed to the bar 2 and has mounted on its outwardly projecting part a coiled spring 90 one end of which is secured to the clip at 91 and its other end secured to the pin at 92. This spring is of such strength and so adjusted that it will raise the adjustable brace composed of the members 2 and 3, together with the supporting leg 1, into the position shown in Fig. 1, or the position in which the cycle supporting mechanism is carried when not in use.

When it is desired to bring the cycle supporting mechanism into use, this may be done by the rider without dismounting, by reaching backward with his foot and drawing the pedal lever arm 5 forward and down. This will distend the collapsible brace composed of members 2 and 3 bringing it by successive reciprocations of the arm 5, into the position shown in Figs. 2 and 3. The final reciprocation of the arm 5 will bring the pinion 4 into the position shown in Fig. 6, wherein its sector, which is free of teeth, will be next to the rack bar 2. When it is desired to raise the cycle supporting mechanism, the lever arm 5 is forced backward beyond its normal position, thus engaging its lug 52 with the lug 81 of the pawl to raise the pawl out of locking position, whereupon the weight of the cycle, together with the effort exerted by the spring 90, will raise the parts into the position shown in Fig. 1.

Having thus described my invention, what I claim as new, and desire to secure by Letters Patent of the United States of America, is:—

1. A cycle supporting device comprising supporting legs pivoted to the frame and swinging forwardly and up when not in use, a brace for said legs composed of two connected and relatively sliding members, one secured to the lower part of the supporting legs and the other to the cycle frame forwardly of the pivot of said supporting legs, a pedal lever pivoted upon one of the brace members and means operated by the pedal member for distending said brace members.

2. A cycle supporting device comprising a leg and a brace each pivotally secured by one end to the cycle at separated points, and pivoted by their other end to each other, one of said members being composed of telescoping parts, and foot operated means for extending the parts of the telescopic member.

3. A cycle supporting device comprising a leg and a brace each pivotally secured by one end to the cycle at separated points, and pivoted by their other end to each other, one of said members being composed of telescoping parts, one of said parts being toothed to form a rack, a pinion upon the other part engaging this rack, and a lever having a ratchet engagement with, and adapted to turn said pinion.

4. A cycle supporting device comprising a leg and a brace each pivotally secured by one end to the cycle at separated points, and pivoted by their other end to each other, one of said members being composed of telescoping parts, one of said parts being toothed to form a rack, a pinion upon the other part meshing with the rack teeth and having a segment cut away to clear the rack teeth, an operating arm having a ratchet engagement adapted to turn said pinion, and a holding dog on one part engaging the rack teeth upon the other part.

5. A cycle supporting device comprising a leg and a brace each pivotally secured by one end to the cycle at separated points, and pivoted by their other end to each other, said brace being composed of telescoping parts, one of which is toothed to form a rack, a pinion upon the other part engaging this rack, a lever having a ratchet engagement with and adapted to turn said pinion, a spring tending to return said lever to normal position, and a holding dog upon one part engaging the rack teeth upon the other part.

6. A cycle supporting device comprising a leg and a brace each pivotally secured by one end to the cycle at separated points, and pivoted by their other end to each other, said brace being composed of telescoping parts, one of which is toothed to form a rack, a pinion upon the other part engaging this rack, a lever having a ratchet engagement with and adapted to turn said pinion, a spring tending to return said lever to normal position, and a holding dog upon one part engaging the rack teeth upon the other part, said lever and the holding dog having portions engageable by movement of the lever back of its normal position, to thereby release the dog.

7. A cycle supporting device comprising supporting legs pivoted to the frame and swinging forwardly and up when not in use, a brace for said legs composed of two connected and relatively sliding members, one secured to the lower part of the supporting legs and the other to the cycle frame forwardly of the pivot of said supporting legs, a spring acting to draw said sliding members together, a pedal lever pivoted upon one of the brace members, and means operated by the pedal member for distending said brace members.

8. A cycle supporting device comprising a leg and a brace therefor, each pivotally secured by one end to the cycle at separated points, and pivoted by their other end to each other, said brace being composed of telescoping parts, a spring acting to telescope said parts, one of said parts being toothed to form a rack, a pinion upon the other part engaging said rack, and a lever having a ratchet engagement with and adapted to turn said pinion.

Signed at Seattle, Washington, this 1st day of July, 1915.

KINTARO MIYANAGA.

Copies of this patent may be obtained for five cents each, by addressing the "Commissioner of Patents Washington, D. C."